(12) United States Patent
Liebenow (10) Patent No.: US 6,305,805 B1
(45) Date of Patent: *Oct. 23, 2001

(54) SYSTEM, METHOD AND SOFTWARE FOR CORRECTING KEYSTONING OF A PROJECTED IMAGE

(75) Inventor: Frank Liebenow, Dakota Dunes, SD (US)

(73) Assignee: Gateway, Inc., N. Sioux City, SD (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/213,840

(22) Filed: Dec. 17, 1998

(51) Int. Cl.$^7$ .................................................. G03B 21/00
(52) U.S. Cl. ............................................................ 353/69
(58) Field of Search ................................ 353/69, 70, 119, 353/122; 348/744, 745, 746, 747

(56) References Cited

U.S. PATENT DOCUMENTS

| | | | |
|---|---|---|---|
| 3,639,034 | 2/1972 | La Russa | 350/31 |
| 3,963,337 | 6/1976 | Lundberg | 353/70 |
| 4,004,093 | 1/1977 | Oland | 358/60 |
| 4,194,216 | 3/1980 | Ohmori | 358/60 |
| 4,210,929 | 7/1980 | Takabayashi | 358/64 |
| 4,422,153 | 12/1983 | Arai et al. | 364/525 |
| 5,664,858 | 9/1997 | Woo | 353/69 |

*Primary Examiner*—Safet Metjahic
*Assistant Examiner*—E P LeRoux
(74) *Attorney, Agent, or Firm*—Suiter & Associates PC (57) ABSTRACT

A presentation system, method and software for displaying an image on a screen and correcting image keystoning caused by a projection lens of a projector not being centered on the screen. The presentation system comprises a computer including a processor and memory and a projector interfaced with the computer to project an image A stored in the computer's memory. A program of instructions stored in the computer's memory includes instructions configured to correct keystoning of the image projected by the projector without centering the projector on the screen. The program provides a software solution to avoid hardware modifications to the computer or projector to correct keystoning. The program also includes instructions configured to input right/left and upward/downward projection angles to correct keystoning caused by some combination of the angles being greater than or less than 90°.

18 Claims, 6 Drawing Sheets

SYSTEM, METHOD AND SOFTWARE FOR CORRECTING KEYSTONING OF A PROJECTED IMAGE

FIELD OF THE INVENTION

The present invention generally relates to projection systems for displaying an image on a screen and, more particularly, to systems and methods for correcting image keystoning in a projection system caused by a projection lens of a projector not being centered on the screen.

BACKGROUND OF THE INVENTION

Generally, a display system for displaying an image is divided broadly into direct-view picture display systems represented by CRTs (Cathode Ray Tubes) and projection systems having projectors for displaying an image on a screen (hereinafter referred to as "projectors"). With projectors, an image is magnified via a projection lens and is displayed on a screen. When the projector is not centered or cannot be centered on the screen, i.e., the lens is not at a 90° angle to the center of the screen, the resulting projected image is distorted or skewed. This phenomenon is known in the art as keystoning. With keystoning, an asymmetrical image is projected onto the screen. In other words, the image projected onto the screen has a trapezoidal shape (keystone) as opposed to a rectangular shape.

Figure 1:
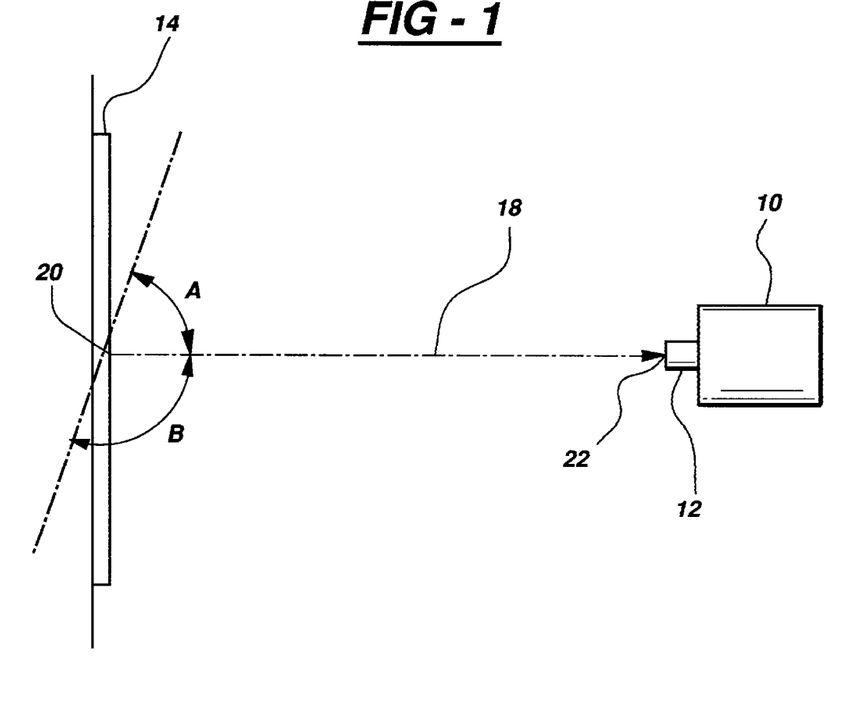
FIGS. 1 and 2 are views illustrating an arrangement of a projector and a projector lens with respect to a screen and the shape of an image projected onto the screen without keystoning, respectively.
Figure 2:
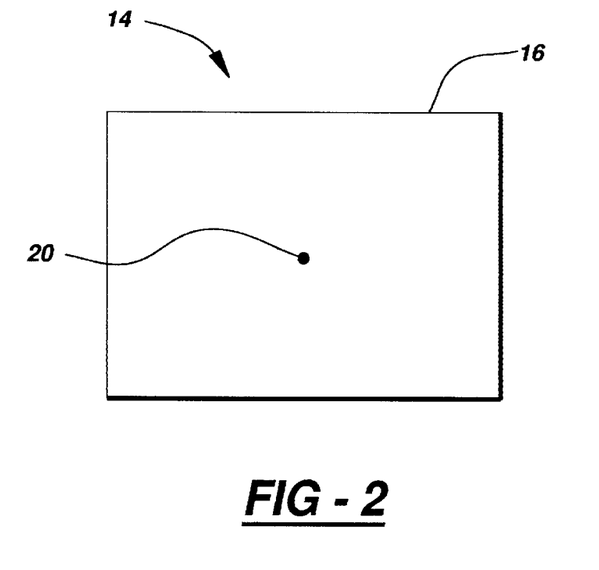

FIG. 1 illustrates a projector 10 having a projection lens 12 at a 90° angle to the center of a screen 14 resulting in image 16 which is projected in the shape of a rectangle onto screen 14 without keystoning or trapezoidal distortion or skewing as shown in FIG. 2. As shown in FIGS. 1 and 2, a center axis 18 is a line connecting a point 20 lying on the surface plane of screen 14 and a center point 22 of projection lens 12 of projector 10. Center axis 18 forms an upward/downward projection angle A and a right/left projection angle B with the surface of screen 14. When projection angles A and B are 90° as shown in FIGS. 1 and 2, projector 10 and projection lens 12 are said to be "centered" or at a 90° projection angle to screen 14. Projection angles A and B are referred to as upward/downward and right/left projection angles, respectively, since center point 22 of projection lens 12 is either below/above point 20 or to the right/left of point 20, respectively.

Figure 3:
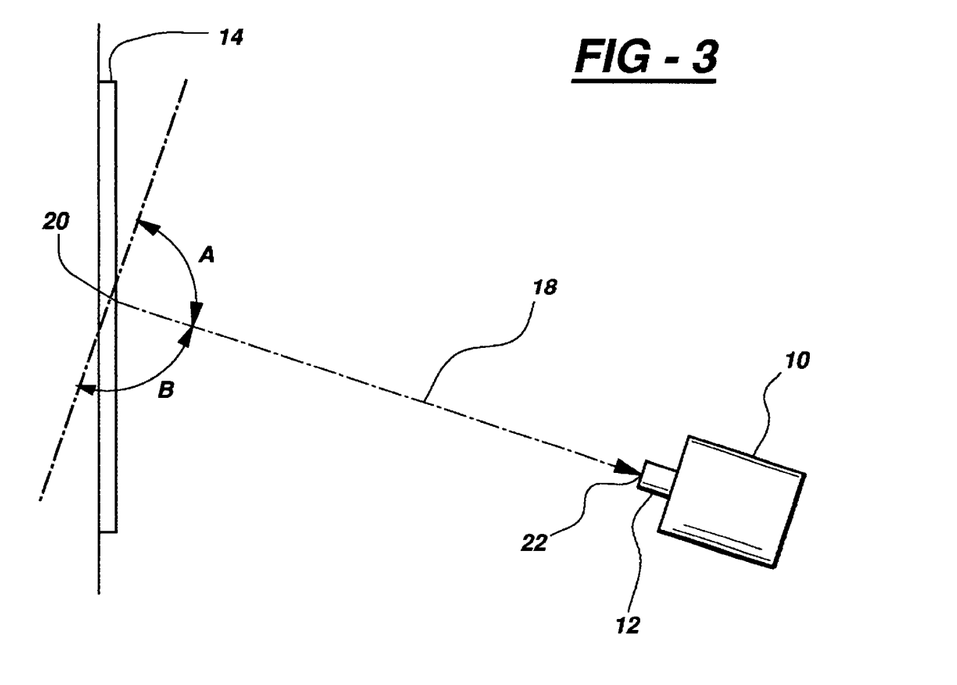
FIGS. 3 and 4 are views illustrating an arrangement of a projector and a projector lens with respect to a screen and the shape of an image projected onto the screen with keystoning, respectively.
Figure 4:
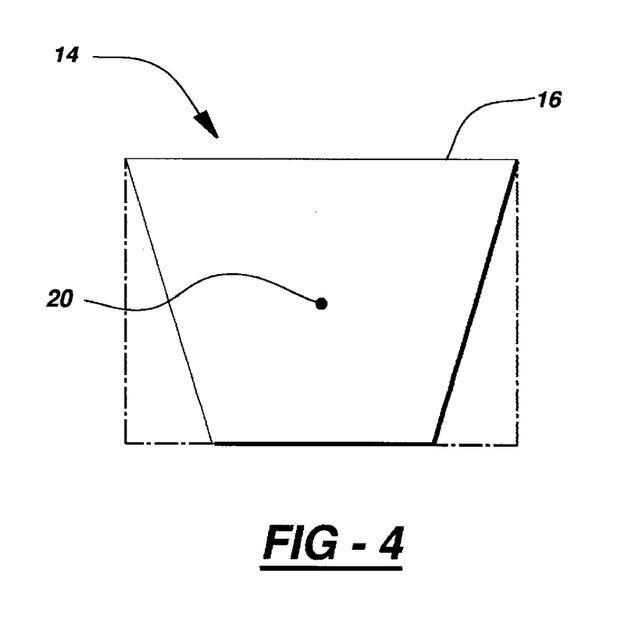

Referring now to FIGS. 3 and 4 wherein reference numerals or letters which are like, similar, or identical to reference numerals or letters used in FIGS. 1 and 2 indicate like, similar, or identical components or features. Here, upward/downward projection angle A and/or right/left projection angle B are not equal to 90° resulting in image 16 being projected in the shape of a trapezoid onto screen 14 with keystoning.

In U.S. Pat. No. 5,664,858 (incorporated herein by reference), Woo discloses an apparatus and method for pre-compensating an asymmetrical picture in a projection system to correct keystoning when a projection lens of a projector is arranged at an upward or downward projection angle relative to a screen. The apparatus and method disclosed are implemented in a hardware intensive configuration shown in FIG. 7 therein. With presentation systems utilizing a computer and a software application, such as Power Point (Power Point is a trademark of Microsoft Corporation), to generate and store images and a projector (such as manufactured and sold by Boxlight Corporation or Epson America, Inc.) which interfaces with the computer to project the computer-generated images on a screen, modifying the computer or projector to include the hardware solution proposed by Woo to correct keystoning is not practical. Also, the hardware solution proposed by Woo does not correct keystoning caused by a projection lens of a projector being arranged at projection angles other than an upward/downward projection angle, such as right/left projection angles or a combination of a right/left projection angle and an upward/downward projection angle. What is needed is a software solution for such a presentation system to correct keystoning, without having to center the projector on the screen, to avoid the need to modify the computer's or projector's hardware and to correct keystoning caused by projection angles other than an upward/downward projection angle.

SUMMARY OF THE INVENTION

Accordingly, the present invention provides a presentation system comprising at least one processor, memory operably associated with the processor, at least one output port operably associated with the processor and the memory and configured to output an image storable in the memory, a program of instructions configured to be executed by the processor and stored in the memory, the program including instructions configured to correct keystoning of the image output by the output port.

The present invention also provides a method for correcting keystoning of an image projected by a presentation system including at least one processor, memory operably associated with the processor and configured to store the image, and at least one output port operably associated with the processor and the memory and configured to output the image, said method comprising the steps of: maintaining the image in the is memory; and maintaining a program of instructions configured to be executed by the processor and stored in the memory, wherein said program includes instructions to correct keystoning of the image output by the output port by modifying the image stored in memory.

The present invention further provides a computer readable medium tangibly embodying a program of instructions configured to correct keystoning of an image projected by a presentation system including at least one processor, memory operably associated with the processor and configured to store the image, and at least one output port operably associated with the processor and the memory and configured to output the image.

In accordance with one aspect of the present invention, the program includes instructions configured to input a right/left projection angle to correct keystoning of the image caused by, at least in part, the right/left projection angle being greater than or less than 90°.

It is an object of the present invention to provide a software solution for correcting keystoning of an image projected by a projector in a presentation system including a computer interfaced to the projector, without having to center the projector on the screen, to avoid the need to modify the computer's or projector's hardware.

It is another object of the present invention to provide omnidirectional keystone correction, i.e., correcting keystoning of an image when upward/downward and/or right/left projection angles are not 90°.

The present invention provides the advantage of avoiding hardware modification of a presentation system including a projector and a computer and avoiding the need to center the projector on a screen to correct keystoning of an image projected by the projector.

The present invention also provides the advantage of correcting keystoning of an image caused by, at least in part, the right/left projection angle being greater than or less than 90°.

BRIEF DESCRIPTION OF THE DRAWINGS

Other objects, advantages, features and characteristics of the present invention, as well as methods, operation and functions of related elements of structure, and the combination of parts and economies of manufacture, will become apparent upon consideration of the following description and claims with reference to the accompanying drawings, all of which form a part of this specification, wherein like reference numerals designate corresponding parts in the various figures, and wherein:

DETAILED DESCRIPTION OF A PREFERRED EMBODIMENT OF THE INVENTION

In the following detailed description of the preferred embodiments, reference is made to the accompanying drawings which form apart hereof, and in which is shown by way of illustration specific preferred embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the appended claims.

Figure 5:
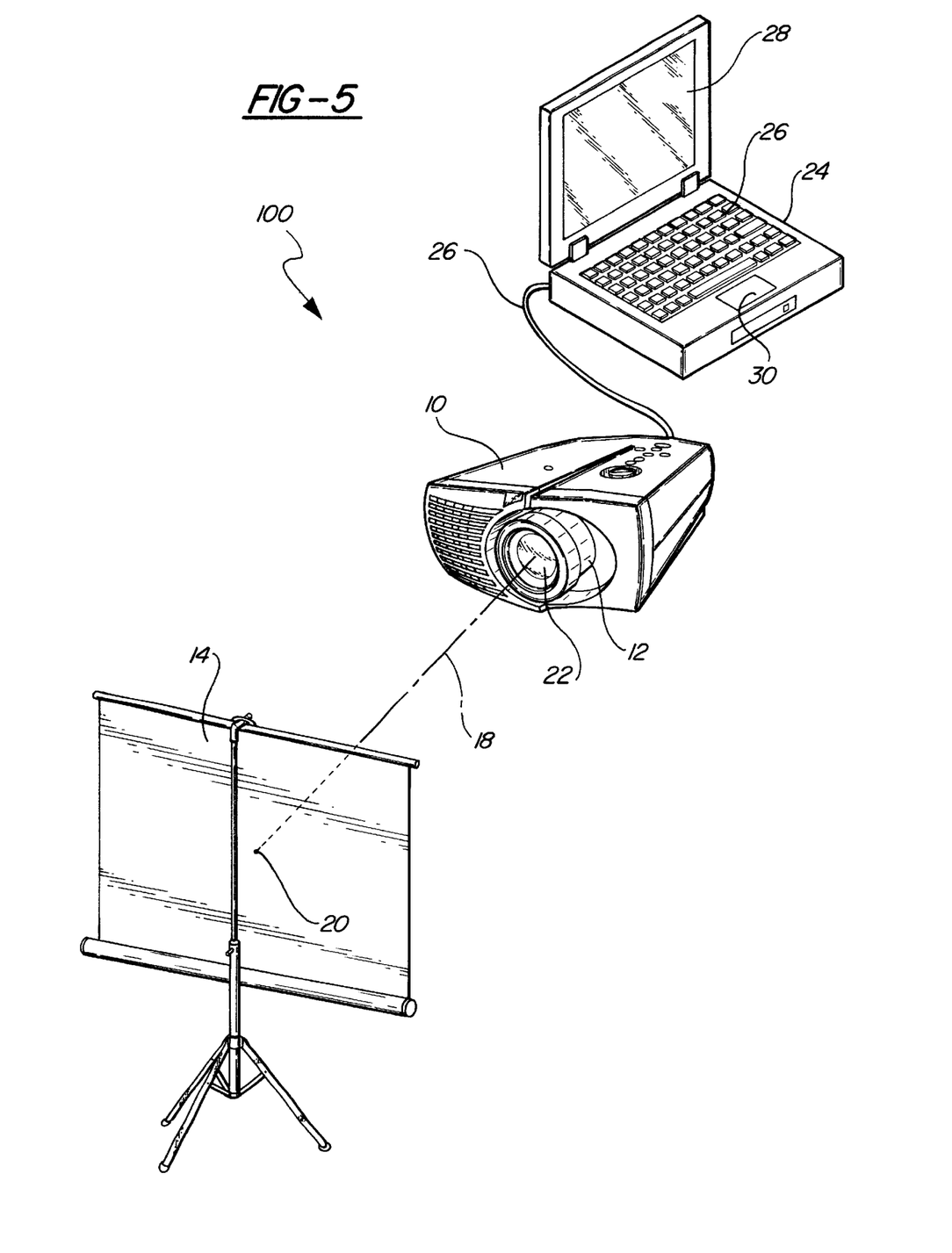
FIG. 5 is a perspective view of a presentation system according to a preferred embodiment of the present invention.

Referring now to FIG. 5, a perspective view of a presentation system 100 according to a preferred embodiment of the present invention is shown. Reference numerals or letters in FIG. 5 which are like, similar, or identical to the reference numerals or letters of FIGS. 1–4 indicate like, similar, or identical components or features. Presentation system 100 depicted in FIG. 5 is a preferred representative hardware environment for practicing the present invention and includes a computer 24, such as a Gateway computer (Gateway and Gateway 2000 are trademarks of Gateway 2000, Inc.). Preferably, computer 24 is running a Microsoft Windows operating system such as Windows 95 or Windows 98 (Windows, Windows 95, and Windows 98 are trademarks of Microsoft Corporation). However, it will be apparent to one skilled in the art that the present invention may be practiced without the specific details and be implemented in various computer systems utilizing various operating systems and in various configurations or makes or models of tightly coupled processors or in various configurations of loosely coupled multiprocessor systems.

Computer 24 is shown as a portable computer system such as the Solo 9100XL portable computer system (Solo is a trademark of Gateway 2000, Inc.). In other embodiments, computer 24 may be a desktop computer. Computer 24 is interfaced with projector 10 via a cable 26. Cable 26 transmits image information stored in computer 24 to projector 10 for projecting an image upon screen 14. A presentation application program such as Power Point (Power Point is a trademark of Microsoft Corporation) may be run on computer 24 to allow a user to generate and store images in computer 24 as well as transmit the images to projector 10 via cable 26 for presentation. Computer 24 includes a keyboard 26, display device 28, and a pointing device 30. Keyboard 26 permits entry of textual information into the computer via depression of one or more of a plurality of keys. Pointing device 30 is an input device permitting control over the graphical user interface of the operating system (e.g., a Microsoft Windows operating system). For example, pointing device 30 permits a user to control the movement of a pointer within the graphical user interface. The invention is not limited to any particular pointing device 16, although a touchpad is shown in FIG. 5. Other pointing devices include a mouse, a wheel, a trackball, and a joystick. Display device 28 permits display of information by the computer. The invention is not limited to any particular display device 28. In the case of a portable computer 24, as shown in FIG. 5, display device 28 is preferably a LCD (liquid crystal display) screen. In the case of a non-portable computer 24, display device 28 is conventionally a monitor housing a cathode ray tube (CRT).

Figure 6:
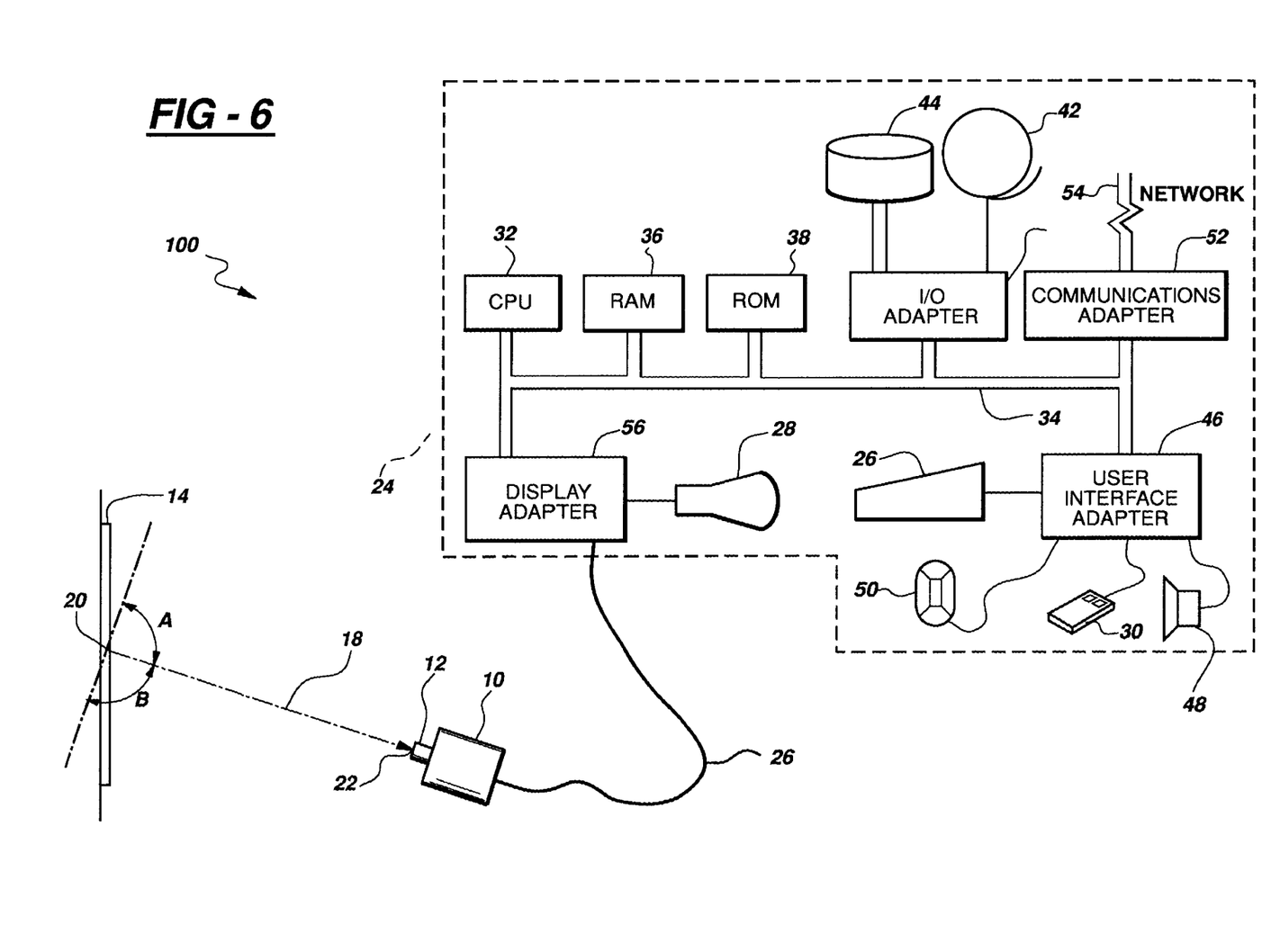
FIG. 6 is a detailed block diagram of the presentation system depicted in FIG. 5 according to the preferred embodiment of the present invention.

Referring now to FIG. 6, a detailed block diagram of presentation system 100 depicted in FIG. 5 according to the preferred embodiment of the present invention is shown, wherein reference numerals or letters which are like, similar, or identical to reference numerals or letters used in FIGS. 1–5 indicate like, similar, or identical components or features. Computer 24 includes at least one central processing unit (CPU) 32. CPU 32 is interconnected via system bus 34 to random access memory (RAM) 36, read-only memory (ROM) 38, and input/output (I/O) adapter 40 for connecting peripheral devices such as disk units 42 and tape drives 44 to bus 34, user interface adapter 46 for connecting keyboard 26, pointing device 30, speaker 48, microphone 50, and/or other user interface devices such as a touch screen device (not shown) to bus 34, communication adapter 52 for connecting computer 24 to an information network 54 such as the Internet, and display adapter 56 for connecting bus 34 to display device 28 and projector 10.

In the preferred embodiment, presentation system 100 comprises at least one processor 32, memory 36 or 38 operably associated with processor 32, and projector 10 operably associated with processor 32 and memory 36 or 38. Preferably, as shown in FIGS. 5 and 6, computer 24 includes processor 32 and memory 36 or 38 and is operably coupled to projector 10 via cable 26. In another embodiment, projector 10 may include, i.e., house, computer 24 and, in particular, processor 32 and memory 36 or 38. Projector 10 is configured to project an image comprising a number of pixels storable in memory 36 or 38. System 100 includes a program of instructions configured to be executed by processor 32 and stored in memory 36 or 38. The program includes instructions configured to correct keystoning of the image projected by projector 10. The program of instructions can be included in a presentation program application, such as Power Point, or be an independent program application. The program of instructions includes instructions which implement image transformation algorithms already known in the art to either compress portions of the projected image 16 by reducing the number of pixels by deleting pixels or expanding portions of the projected image 16 by increasing the number of pixels by adding pixels. Compression is preferred, since there is generally a limit on the resolution of an image which is expanded.

Figure 7:
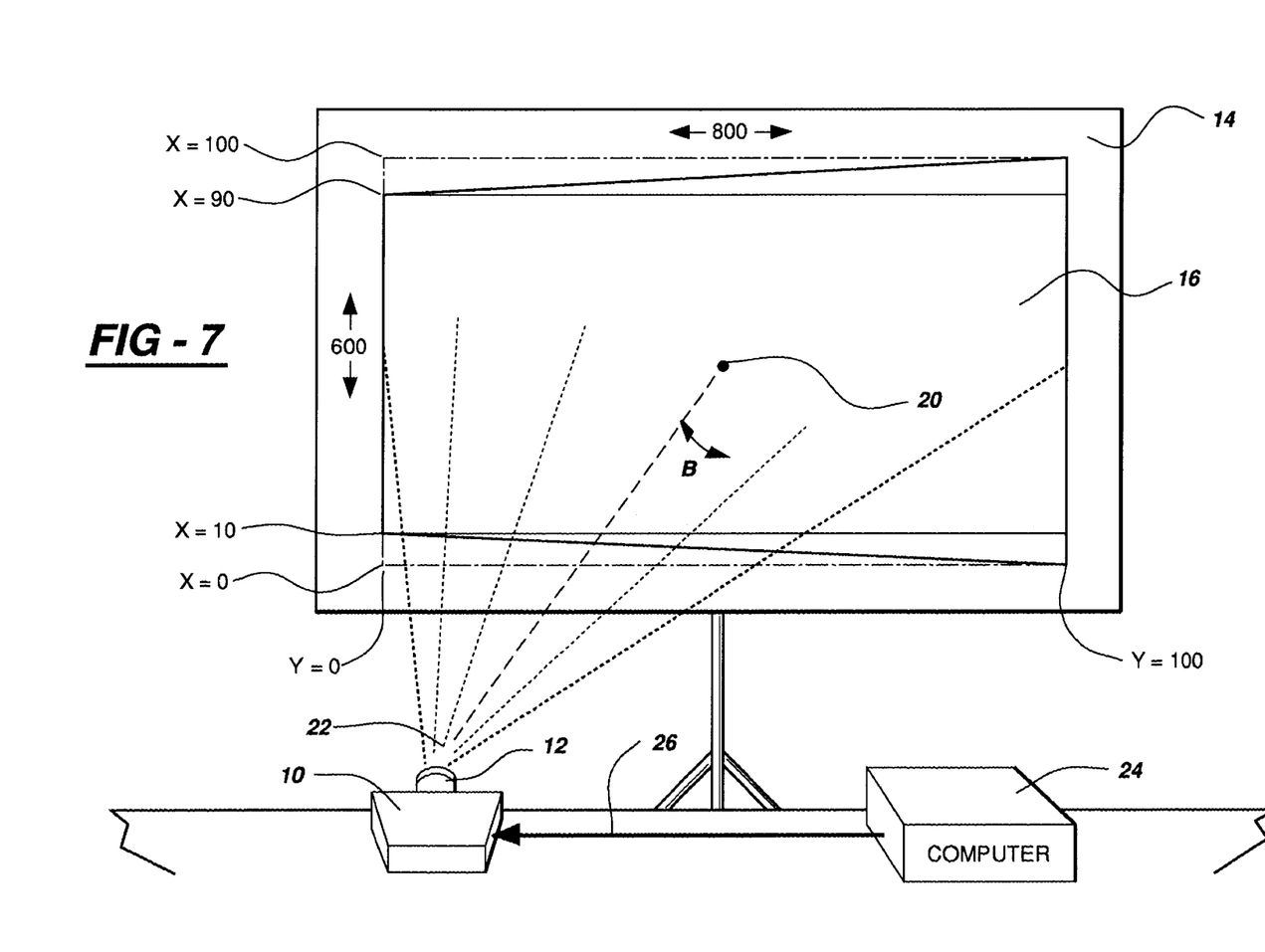
FIG. 7 is a graphic example illustrating one method for correcting keystoning according to the present invention.

Referring now to FIG. 7, an example illustrating one technique or keystone correction algorithm implemented by the program of instructions according to the invention for correcting keystoning of the image 16 projected by projector 10 is shown. Reference numerals or letters which are like, similar, or identical in FIG. 7 to reference numerals or letters in FIGS. 1–6 indicate like, similar, or identical components or features. In this example, image 16 resolution is 800 columns of pixels by 600 rows of pixels. Due to projector 10 being left of center, i.e., point 22 is to the left of point 20, a keystone image results caused by the right/left projection angle B being less than 90°. Although not shown, upward/downward projection angle A is 90° in this case. The height of the projected image 16 increases from column 0 (Y=0) to column 799 (Y=100). To correct this keystoning, the height of projected image 16 starting at the left-most column, column 0, could be expanded by adding pixels. Instead, the following describes a keystone correction algorithm for compression of the projected image 16 by deleting pixels as part of the preferred embodiment. However, a similar algorithm can also be applied to expand the projected image 16 by adding pixels to correct keystoning.

In this example, the height of projected image 16 starting at column n, the right-most column, column 799, is compressed by deleting 20% of the pixels. Algorithms known in the art can be used to determine which pixels should be deleted (dithering). One way to select which pixels to delete would be to delete every fifth pixel, center the remaining pixels, and replace the empty pixels at the top and bottom of each column with blank pixels (e.g., black pixels). Other algorithms will randomize the pixels selected to be deleted/added so as not to create any visual patterns.

The keystone correction algorithm would be operated on each column of the image with a linear reduction of the number of pixels deleted until the left-most column (column number 0) is reached, where no pixels would be deleted. According to the algorithm, the number of pixels deleted/added will be:

(left of center) (<90°)

column = current column col = # columns in display row = # rows in display reduction = % reduction at right-most column p = # pixels to reduce for (i = 0; i < #col; ++i){

$$p = \frac{i}{\#col} \times reduction \times \#rows;$$

delete pixels(p);

} wherein++i designates incrementing the value of the variable i by 1 before each pass through the above "for" loop.

A similar algorithm could be used for deleting/adding pixels from columns for up/down keystoning as opposed to left/right keystoning.

In addition to the keystone correction algorithm, the program of instructions according to the present invention includes an input for upward/downward projection angle A and an input for right/left projection angle B so that a user can input such angles using keyboard 26 or pointing device 30, for example. The program of instructions uses angles A and B to determine Q and calculate P according to the above formula. The angle input can be absolute or incremental, for example, a dial or slider control can be used to increase or decrease projector angle.

Figure 8:
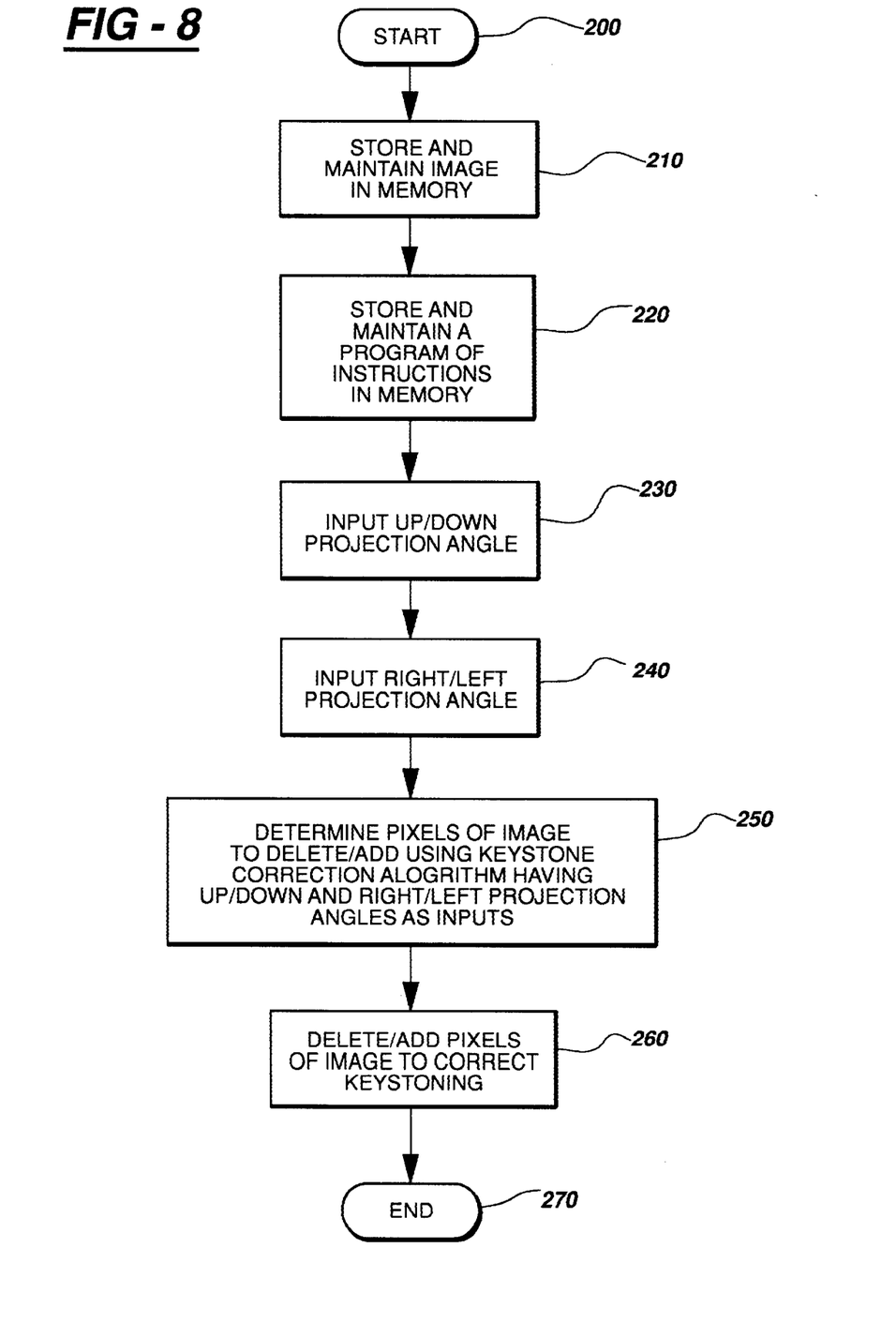
FIG. 8 is a flowchart further illustrating the method described in connection with FIG. 7 for correcting keystoning according to the present invention.

Referring now to FIG. 8, a flowchart further illustrating the method described in connection with FIG. 7 for correcting keystoning according to the present invention is shown. The method starts with step 200. In step 210, image 16 is stored and maintained in memory 36 or 38. In step 220, the program of instructions according to the present invention is stored and maintained in memory 36 or 38. A user inputs upward/downward projection angle A and right/left projection angle B in steps 230 and 240. In step 250, the program of instructions according to the present invention determines which pixels of image 16 to delete/add using the keystone correction algorithm described above in connection with FIG. 7 using angles A and B as inputs. In step 260, the pixels selected are deleted/added, then the remaining pixels are centered, to correct keystoning. The method ends in step 270.

In this manner, the present invention provides omnidirectional keystone correction, i.e., correcting keystoning of an image when upward/downward and/or right/left projection angles are not 90°. The present invention also avoids hardware modification of a presentation system including a projector and a computer and avoids the need to center the projector on a screen to correct keystoning of an image projected by the projector.

Although an embodiment of the present invention has been shown and described in detail herein, along with certain variants thereof, many other varied embodiments that incorporate the teachings of the invention may be easily constructed by those skilled in the art. Accordingly, the present invention is not intended to be limited to the specific form set forth herein, but on the contrary, it is intended to cover such alternatives, modifications, and equivalents, as can be reasonably included within the spirit and scope of the invention.

Although the invention has been described with a certain degree of particularity, it should be recognized that elements thereof may be altered by persons skilled in the art without departing from the spirit and scope of the invention. One of the preferred implementations of the invention is as sets of instructions resident in the random access memory 36 of one or more computer or information handling systems configured generally as described in FIGS. 5 and 6. Until required by the computer system, the set of instructions may be stored in another computer readable memory, for example, in a hard disk drive or in a removable memory such as an optical disk for eventual use in a CD-ROM drive or a floppy disk for eventual use in a floppy disk drive. Further, the set of instructions can be stored in the memory of another computer and transmitted over a local area network or a wide area network, such as the Internet, when desired by the user. One skilled in the art would appreciate that the physical storage of the sets of instructions physically changes the medium upon which it is stored electrically, magnetically, or chemically so that the medium carries computer readable information. The invention is limited only by the following claims and their equivalents.

I claim:

1. A presentation system comprising:

at least one processor;

memory operably associated with said processor;

at least one output port operably associated with said processor and said memory and configured to output an image storable in said memory, the image comprising a number of pixels arranged in a number of rows and a number of columns; and a program of instructions configured to be executed by said processor and stored in said memory, said program including instructions for obtaining a number p of pixels not rendered in at least one of a given row and a given column of the image output by said output port from at least one of a corresponding row and a corresponding column of the image stored in memory and further including selecting p pixels from at least one of the given row and the given column of the image stored in memory not to be rendered in the at least one of the corresponding row and the corresponding column of the image output by said output port.

2. A presentation system as in claim 1 wherein, in said program of instructions, the number p of pixels not rendered in at least one of a given row and a given column of the image output by said output port is obtained using at least one of the following formulas:

p=(row/#row) X reduction X row, and p=(column#col) X reduction X column, where p=# pixels not rendered in current column;

column=number of current column from column 0;

row=number of current row from row 0;

reduction=% reduction in at least one of row n and column n;

col=#columns in display; and row=# rows in display.

3. A presentation system as in claim 1, wherein, in said program of instructions, selecting p pixels not rendered comprises dithering.

4. A presentation system as in claim 1 wherein, in said program of instructions, said means for selecting p pixels not rendered comprises selecting each pixel in order in at least one of the row and the column of the image stored in memory which is a multiple of the following number as an integer:

row, where p row=# rows in display.

5. A presentation system as in claim 1 wherein, in said program of instructions, said means for selecting p pixels not rendered comprises selecting pixels at random from at least one of the row and the column of the image stored in memory.

6. A presentation system as in claim 1 wherein said program of instructions further includes instructions for input of at least one of upward/downward projection angle and right/left projection angle and wherein the number p of pixels not rendered in at least one of the given row and the given column of the image output by said output port is derived from said input.

7. A method for correcting keystoning of an image projected by a presentation system including at least one processor, memory operably associated with the processor and configured to store the image, and at least one output port operably associated with the processor and the memory and configured to output the image, the image comprising a number of pixels arranged in a number of rows and a number of columns, said method comprising the steps of:

maintaining the image in the memory; and maintaining a program of instructions configured to be executed by the processor and stored in the memory, said program including instruction for obtaining a number p of pixels not rendered in at least one of a given row and a given column of the image output by said output port from at least one of a corresponding row and a corresponding column of the image stored in memory and further including selecting p pixels from at least one of the row and the column of the image stored in memory not to be rendered in at least one of the corresponding row and the corresponding column of the image output by said output port.

8. A method as recited in claim 7 wherein, in said program of instructions, the number p of pixels not rendered in at least one of a given row and a given column of the image output by said output port is obtained using at least one of the following formulas:

p=(row/#row) X reduction X row and p=(columnl#col) X reduction X column, where p=# pixels not rendered in current column;

column=number of current column from column 0;

row=number of current row from row 0;

reduction=% reduction in at least one of row n and column n;

col=#columns in display; and row=# rows in display.

9. A method as receited in claim 7, wherein, in said program of instructions, selecting p pixels not rendered comprises dithering.

10. A method as recited in claim 7, wherein, in said program of instructions, said means for selecting p pixels not rendered comprises selecting each pixel in order in at least one of the row and the column of the image stored in memory which is a multiple of the following number as an integer:

row, where p row=# rows in display.

11. A method as recited in claim 7, wherein, in said program of instructions, said means for selecting p pixels not rendered comprises selecting pixels at random from at least one of the row and the column of the image stored in memory.

12. A method as recited in claim 7 wherein said program of instructions further includes instructions for input of at least one of upward/downward projection angle and right/left projection angle and wherein the number p of pixels not rendered in at least one of the given row and the given column of the image output by said output port is derived from said input.

13. A computer readable medium tangibly embodying a program of instructions configured to correct keystoning of an image to be rendered, the image comprising a number of pixels arranged in a number of rows and a number of columns, said program including instructions for obtaining a number p of pixels not to be rendered in at least one of a given row and a given column and further including selecting which p pixels in least one of the given row and the given column are not rendered.

14. A computer readable medium as in claim 13 wherein the number p of pixels not rendered in at least one of a given row and a given column is obtained using at least one of the following formulas:

p=(row/#row) X reduction X row, and p=(columnl#col) X reduction X column, where p=# pixels not rendered in current column;

column=number of current column from column 0;

row=number of current row from row 0;

reduction=% reduction in at least one of row n and column n;

col=#columns in display; and row=# rows in display.

15. A computer readable medium as in claim 13, wherein selecting which p pixels in at least one of the given row and the given column are not rendered comprises dithering.

16. A computer readable medium as in claim 13, wherein said means for selecting which p pixels in at least one of the given row and the given column are not rendered comprises selecting each pixel in order in a column which is a multiple of the following number as an integer:

row, where p row=# rows in display.

17. A computer readable medium as in claim 13, wherein selecting which p pixels in at least one of the given row and the given column are not rendered comprises selecting pixels in the column at random.

18. A computer readable medium as in claim 13, wherein said program of instructions further includes instructions for input of at least one of upward/downward projection angle and right/left projection angle and wherein the number p of pixels not rendered in at least one of the given row and the given column is derived from said input.

* * * * *